United States Patent [19]

Nighan et al.

[11] Patent Number: 4,817,096
[45] Date of Patent: Mar. 28, 1989

[54] MULTIPLE WAVELENGTH EXCIMER LASER

[75] Inventors: William L. Nighan, Manchester, Conn.; Roland A. Sauerbrey; Frank K. Tittel, Both of Houston, Tex.

[73] Assignee: United Technologies Corporation, Hartford, Conn.

[21] Appl. No.: 240,370

[22] Filed: Aug. 29, 1988

Related U.S. Application Data

[63] Continuation of Ser. No. 844,450, Mar. 26, 1986, abandoned.

[51] Int. Cl.⁴ .................. H01S 3/30; H01S 3/22; H01S 3/223; H01S 3/097
[52] U.S. Cl. .................................. 372/5; 372/23; 372/55; 372/57; 372/60; 372/83; 372/99
[58] Field of Search ............... 372/5, 23, 55, 57, 60, 372/83, 99

[56] References Cited

U.S. PATENT DOCUMENTS

| | | | |
|---|---|---|---|
| 3,327,232 | 6/1967 | Tomiyasu | 372/99 |
| 3,959,741 | 5/1976 | Meinzer | 372/89 |
| 4,295,104 | 10/1981 | Burnham | 372/55 |
| 4,331,937 | 5/1982 | Brown et al. | 372/57 |
| 4,348,647 | 9/1982 | Nighan et al. | 372/57 |
| 4,393,505 | 7/1983 | Fahlen | 372/57 |
| 4,486,884 | 12/1984 | White | 372/20 |
| 4,517,676 | 5/1985 | Meinzer et al. | 372/89 |
| 4,611,327 | 9/1986 | Clark et al. | 372/57 |
| 4,646,311 | 2/1987 | Nighan et al. | 372/60 |
| 4,660,210 | 4/1987 | Nighan et al. | 372/60 |

OTHER PUBLICATIONS

Sasaki et al., "Current Dependence of Spontaneous Emission in CW Kr—Xe Mixed Ion Laser", Japan, J. Appl. Phys., vol. 13, 1974, No. 10, pp. 1677–1678.

Barker et al., "Improved Beam Quality In Double Discharge Excimer Lasers", Applied Optics, vol. 16, No. 7, July 1977, pp. 1792–1793.

J. Hecht, "Excimer Laser Update", *Lasers and Applications*, pp. 43–49, Dec. 1983.

H. Pummer, "The Excimer Laser: 10 Years of Fast Growth", *Photonics Spectra*, May 1985.

J. M. Hoffman et al., "High-Power UV Noble-Gas-Halide Lasers", *Applied Physics Letters*, vol. 28, No. 9, pp. 538–539, 1 May 1976.

*Primary Examiner*—Eugene R. Laroche
*Assistant Examiner*—Michael Shingleton
*Attorney, Agent, or Firm*—Eric W. Petraske

[57] ABSTRACT

A transverse electrically excited gas laser comprises a mixture of rare gases and a fluorine donor at selected partial pressures so as to permit UV and/or visible rare gas-halide laser oscillation at two or more wavelengths simultaneously.

6 Claims, 3 Drawing Sheets

MULTIPLE WAVELENGTH EXCIMER LASER

The Government has rights in this invention pursuant to Contract No. N00014-76-C-0847 awarded by the Department of the Navy.

This is a continuation of Ser. No. 844,450, filed Mar. 26, 1986, abandoned.

DESCRIPTION

TECHNICAL FIELD

This invention relates to electrically excited lasers having wavelengths in the UV/visible region of the spectrum and more particularly to lasers of the rare gas-halide class.

BACKGROUND ART

Excimer gas lasers are part of a family of electronic transition lasers that produce powerful laser pulses having wavelengths in the UV/visible region of the electromagnetic spectrum. The term excimer is used to describe the lasing species which is an excited molecule that is not stable in the ground electronic state. Excimer molecules do not exist in the initial gas mixture but are produced by action of an electrical excitation such as a discharge acting on the initial mixture constituents. This feature distinguishes excimer lasers from other gas lasers.

Of the excimer lasers, those of the rare gas-halide class are the most important because they can be produced with high efficiency using readily available technology such as by the electric discharge method. Examples of rare gas-halide excimer lasers are ArF, KrF, XeCl and XeF generating UV wavelengths of 193 nm, 248 nm, 308 nm and 351 nm, respectively. Lasers of this type are produced commercially and are used for a wide variety of industrial, medical and scientific applications. Their properties are reviewed in comprehensive summary articles by J. Hecht appearing in *Lasers and Applications*, Volume II, page 43, December 1983 and by H. Pummer appearing in *Photonics Spectra*, Vol. 19, p. 73, May 1985.

There are many applications in areas such as spectroscopy, optical diagnostics, materials processing and medicine for which UV or visible laser radiation at more than one wavelength is needed. However the discharge excited rare gas-halide lasers currently known are capable of producing only one wavelength at a time. For example, in order to produce 193 nm radiation typical of the ArF laser, a gas mixture containing Ar and a fluorine donor such as $F_2$ is used in the laser chamber. To generate another wavelength such as 351 nm radiation from XeF the gas mixture must be changed to one containing Xe and $F_2$. Therefore a single laser system can produce only one wavelength at a time. For applications requiring two or more UV wavelengths simultaneously, a separate laser system is required for each wavelength, introducing considerable additional cost and complexity.

Moreover, because rare gas-halide lasers generate very short duration pulses on the order of 10 nsec, synchronization of the laser pulses from different laser systems producing different UV wavelengths is a serious problem. To supplement the UV laser, other applications require a separate visible laser for spatial alignment or where safety considerations require that the laser beam be seen by the eye.

J. M. Hoffman, et al have disclosed in *Applied Physics Letters*, Vol. 28, p. 538, May 1, 1976, the feasibility of achieving simultaneous laser oscillation on the 193 nm ArF transition and the 248 nm KrF transition. However, in that work laser excitation was provided by a high energy electron beam accelerator in which a beam of electrons having an energy of 2 MeV was confined by an externally applied axial magnetic field so as to guide the electron beam longitudinally through the laser chamber. This laboratory means of providing excitation was capable of being fired only ten times per day, and is so complex as to preclude use in practical applications. Means to generate more than one UV wavelength at the same time from a single repetitively pulsed, discharge excited rare gas-halide laser, or to generate a UV wavelength and a visible wavelength simultaneously from such a laser are unknown in the prior art.

DISCLOSURE OF INVENTION

An object of the present invention is to provide an excimer laser generating UV or UV/visible radiation simultaneously at more than one wavelength.

According to the present invention a multiple wavelength excimer laser includes an enclosure disposed about an optic axis and having a longitudinal interior cavity. Within the interior cavity is a gas mixture comprising a buffer gas, a halogen donor gas and a gas comprising at least two elements selected from the group argon, krypton and xenon. Also included is a means for laser excitation that generates an electric field transverse to the optic axis producing a gas discharge in the gas mixture. The laser excitation means further resonates radiation in said gas discharge simultaneously producing laser radiation at a plurality of wavelengths approximately between 150 and 500 nm.

BEST MODE FOR CARRYING OUT THE INVENTION

Figure 1:
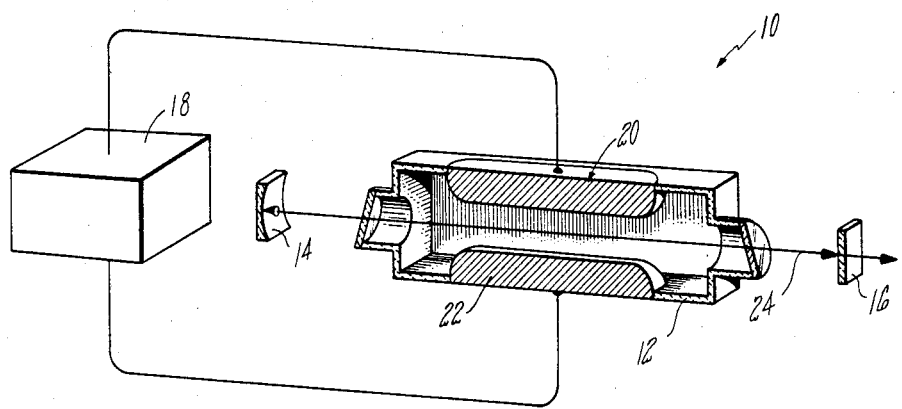
FIG. 1 is a simplified block diagram partially in section and partially in perspective of a multiple wavelength excimer laser provided according to the present invention.

FIG. 1 is a simplified block diagram partially in section and partially in perspective of a multiple wavelength excimer laser 10 provided according to the present invention. Laser chamber 12 includes an optical cavity comprised of an end mirror 14 that is highly reflecting for UV/visible laser wavelengths and an outcoupler 16 having a reflectivity selected to be optimum for the laser wavelengths of interest. In the best mode embodiment, the outcoupler comprises a $CaF_2$ or $MgF_2$ window, having a reflectivity of 5-10% in the UV/visible region. Alternatively, the outcoupler can be a mirror having a preselected reflectivity at specified UV and/or visible wavelengths. The laser chamber is constructed of halogen-compatible materials such as fluorocarbon insulators and easily passivated metals such as aluminum and nickel and is usually equipped with a gas circulation system (not shown) typically comprised of a fan, a heat exchanger and a filter so that a fresh, clean gas mixture (not shown) is always present. In the best mode embodiment the laser chamber comprises a Lambda Physik EMG 100 series excimer laser or equivalent. The gas mixture is of a type described hereinafter that is specifically tailored to produce simultaneous multiple wavelength rare gas-halide laser oscillation.

In the best mode embodiment, the gas mixture is excited by supplying pulsed, high voltage electrical energy from conventional electric power supply 18 to electrodes 20, 22 thereby producing an avalanche electric discharge transverse to optic axis 24. Electrodes 20, 22 are fabricated of a halogen-compatible, sputter-resistant material such as nickel and are similar in design to electrodes found in conventional excimer lasers.

Power supply 18 typically includes a very fast, low inductance circuit designed to provide a source of uniform preionization, such as UV radiation, thereby ensuring the formation of a stable, uniform electric discharge when a main voltage is applied between electrodes 20, 22. The actual pumping of the excimer gas mixture occurs by discharging a high voltage capacitor through a suitable switch such as a thyratron which comprise part of the circuitry of the power supply. Those skilled in the art will note that other, alternative configurations of the laser chamber and alternative methods of providing excitation such as with microwaves, an electron-beam or other energetic particles may be equivalently substituted.

Figure 2:
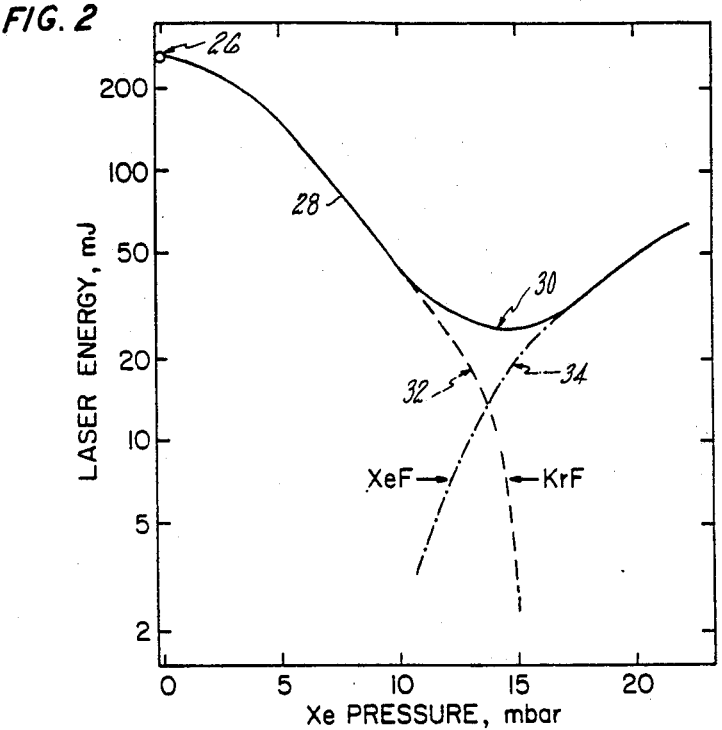
FIG. 2 is a drawing showing the dependence of total UV laser energy as well as separate KrF and XeF laser energies as a function of Xe pressure for a multiple wavelength excimer laser provided according to the present invention.

FIG. 2 is a diagram illustrating total UV laser energy as well as separate KrF and XeF laser energies as a function of Xe partial pressure for a multiple wavelength excimer laser provided according to the present invention. To measure the total UV laser energy at each Xe concentration, a conventional calibrated pyroelectric energy meter was employed while the spectral content of the UV laser was measured using inteference and color glass filters as described by R. A. Sauerbrey, et al in the *IEEE Journal of Quantum Electronics*, Vol. QE-22, p. 230, February 1986, and expressly incorporated by reference herein.

In the best mode embodiment, the laser chamber (12, FIG. 1) is initially filled with a gas mixture approximately comprised of 6 mbar $F_2$, 150 mbar Kr and He at an initial total pressure of 2.5 bar. As indicated by point 26, this gas mixture provides efficient, high power KrF laser pulses at a wavelength of 248 nm when excited in an electric discharge laser apparatus. As Xe is added to the mixture, the total UV laser output energy indicated by curve 28 decreases until a minimum (30) is found for a Xe pressure of about 14 mbar.

For Xe pressures between 10 mbar and 16 mbar a laser generates both 248 nm KrF laser radiation (curve 32) and 351 nm XeF radiation (curve 34) simultaneously with both laser pulses overlapping temporally and having a duration of about 10 nsec. For Xe pressure of about 14 mbar both the 248 nm KrF laser and the 351 nm XeF laser have pulse energies of about 10 mJ corresponding to an overall efficiency of about 0.2%. Decreasing the Xe pressure below 14 mbar causes the 248 nm KrF laser to dominate and increasing the Xe pressure above 14 mbar causes the XeF laser to dominate showing that changes in the Xe pressure can be used to control the relative energies of the simultaneously occurring 248 nm and 351 nm laser pulses.

For the lasers producing the curves of FIG. 2 the outcoupler (16, FIG. 1) was comprised of $CaF_2$ having an 8% reflectivity at both 248 nm and 351 nm. However, significantly improved multiple wavelength laser energy can be obtained by replacing the outcoupler by a mirror having a 20% reflectivity at both wavelengths. Greater improvement occurs with a mirror designed to have separately optimized reflectivities at each of the 248 nm and 351 nm wavelengths, either over the entire planar surface of the mirror or in zones such that the 248 nm and 351 nm laser beams are generated in a side-by-side manner rather than colinearly, as in the present embodiment.

Figure 3:
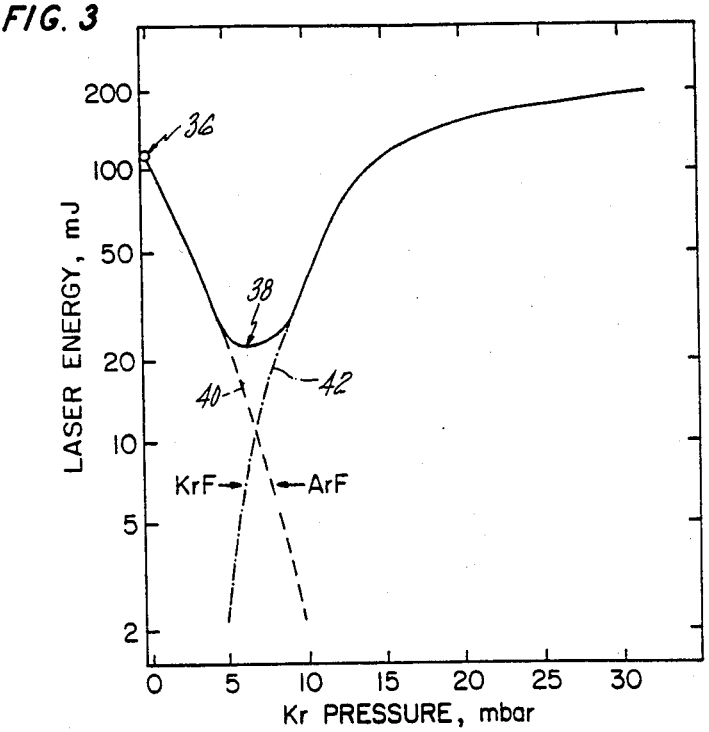
FIG. 3 is a drawing showing the dependence of total UV laser energy as well as separate ArF and KrF laser energies as a function of Kr pressure for an alternative multiple wavelength excimer laser provided according to the present invention.

FIG. 3 is a diagram showing the total UV laser energy as well as separate ArF and KfF laser energies as a function of Kr pressure for another multiple wavelength excimer laser provided according to the present invention. The total UV energy and spectral content of the laser are measured by conventional techniques as described hereinabove. The laser comprises the apparatus described hereinabove with respect to FIG. 1 and has a gas mixture that includes 7.5 mbar $F_2$, 350 mbar Ar and He at an initial total pressure of 2.2 bar. Efficient, high power ArF laser pulses have a wavelength of 193 nm as indicated by point 36. As Kr is added to the gas mixture, the total UV laser output decreases until a minimum (38) is established for a Kr pressure of 6 mbar. At this Kr pressure both the 193 nm ArF laser and a 248 nm KrF laser operate simultaneously with temporally overlapping laser pulses. As indicated by curves 40 and 42 of ArF and KrF respectively, the relative energies for the 193 nm and 248 nm pulses are selectable by varying the Kr pressure around 6 mbar.

It is apparent to those skilled in the art that other simultaneously occuring UV wavelength combinations are also possible such as 193 nm ArF and 351 nm XeF laser radiation from lasers which comprise rare gas-halide mixtures containing Ar, Xe and $F_2$; 193 nm ArF, 248 nm KrF and 351 nm XeF laser radiation from mixtures containing Ar, Kr, Xe and $F_2$; also 222 nm KrCl and 308 nm XeCl laser radiation from mixtures containing Kr and Xe and a suitable chlorine donor such as HCl.

The UV laser action described hereinabove is the result of transitions between the B and X states of the rare gas-halide excimer (the letter B and X being conventional references to particular rare gas-halide electronic states). However, in addition to the XeF 351 nm UV B→X transition, the XeF excimer molecule also exhibits broadband laser action on another transition designated as the C→A transition. Unlike the UV B→X transition, the broadband XeF (C→A) transition is centered in the visible region of the spectrum at a wavelength of 480 nm. A particularly important difference beween the visible 480 nm XeF (C→A) laser transition and the UV 351 nm XeF (B→X) laser transition is the fact that the former transition always exhibits much lower optical gain than is typical of UV rare gas-halide B→X lasers. Therefore, in order to provide simultaneous UV and visible laser oscillation from the XeF excimer transitions excited in a single laser chamber an outcoupler must be provided that has separately optimized transmission and reflection properties at each of the 351 nm and 480 nm wavelengths, as described by R. A. Sauerbrey, et al in the *IEEE Journal of Quantum Electronics,* Vol. QE-21, p. 418, May 1985, and expressly incorporated by reference herein.

Figure 4:
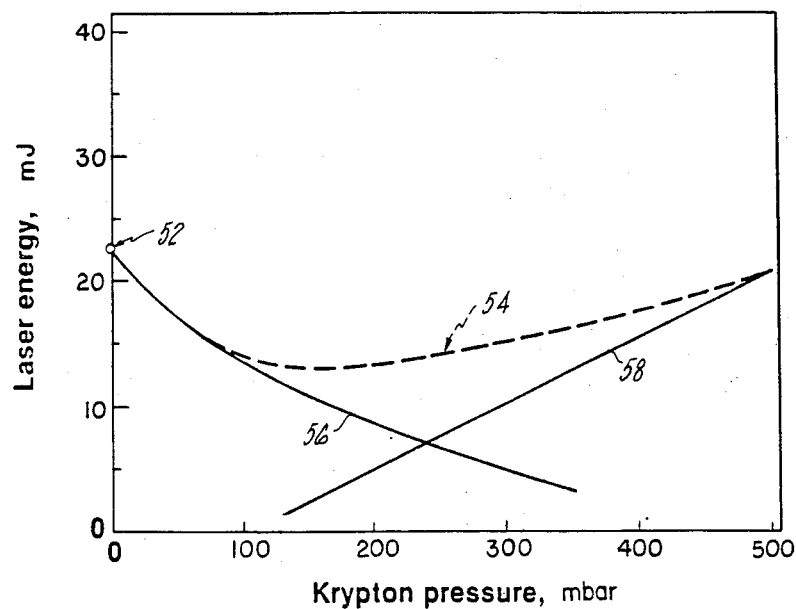
FIG. 4 is a drawing showing the dependence of the total laser energy as well as the 351 nm XeF and 480 nm XeF laser energies as a function of Kr pressure for an alternative embodiment of a multiple wavelength excimer laser provided according to the present invention simultaneously producing visible and UV radiation.

FIG. 4 is a drawing showing the dependence of the total laser energy as well as the 351 nm XeF and 480 nm XeF laser energies as a function of Kr partial pressure for an alternative embodiment of a multiple wavelength excimer laser provided according to the present invention simultaneously producing visible and UV radiation. The laser is similar to that described hereinabove with respect to FIG. 1 and is characterized by an electron beam means of transverse electrical excitation as well as comprising an outcoupler having optimized transmission properties at each of the 351 nm and 480 nm XeF wavelengths.

Figure 5:
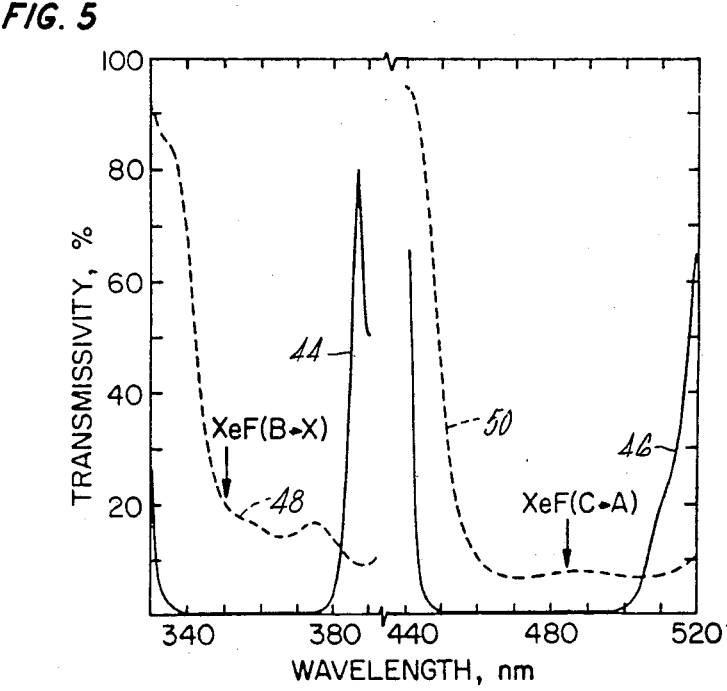
FIG. 5 is a drawing showing the wavelength dependence of the transmission of the highly reflecting mirror and outcoupler used in the UV/visible excimer laser of FIG. 4.

FIG. 5 is a drawing showing the wavelength dependence of the transmission of the outcoupler and highly reflecting mirror used in the laser described hereinabove with respect to FIG. 4. Curves 44 and 46 illustrate the mirror transmission in the wavelength regions 330-385 nm and 440-520 nm, respectively in the UV and visible regions of the spectrum. Curve 48 illustrates that the outcoupler transmission at the 351 nm wavelength of the XeF (B→X) transition is about 20%. As indicated by curve 50, the outcoupler transmission is approximately 10% between 460 nm and 510 nm throughout which the broadband XeF (C→A) transition oscillates. The laser described with respect to FIG. 4 includes a gas mixture comprised of 10.5 mbar $NF_3$, 1.3 mbar $F_2$, 10.5 mbar Xe and Ar at a total pressure of 6.5 bar. Under these conditions 351 nm XeF laser radiation is produced using electron-beam excitation (point 52 in FIG. 4). Upon addition of Kr the total laser energy decreases until a broad minimum (point 54) is established for Kr pressure in the 100 to 200 mbar range. For this range of Kr pressure both the 351 nm and 480 nm XeF excimer transitions are oscillating simultaneously, as indicated by curves 56 and 58 respectively. The relative intensity of the two laser beams are selected by simply changing the Kr pressure. Moreover, the laser efficiency is on the order of 0.3% when both the UV and visible lasers are operating simultaneously.

Simultaneous oscillation of both XeF excimer transitions in a single medium is particularly important since the C→A 480 nm transition is visible. This means that by selecting gas mixtures and by designing the outcoupler to be compatible with both 351 nm and 480 nm laser oscillation, efficient, high power 351 nm XeF laser radiation can be generated simultaneously with a weak 480 nm laser beam that is visible to the eye. The ability to effectively render a UV laser beam at 351 nm visible by the temporal and spatial superposition of a 480 nm laser beam will be useful in a variety of applications. Other outcouplers, suc has side-by-side mirrors or zones on a single mirror designed to separately optimize the transmission characteristics of the 351 nm and 480 nm laser beams will be obvious to those skilled in the art.

Similarly, although the invention has been shown and described with respect to a best mode embodiment thereof, it should be understood by those skilled in the art that various other changes, omissions and additions thereto may be made therein without departing from the spirit and scope of the invention.

We claim:

1. A multiple wavelength excimer laser comprising:
   enclosure means having an optically transmissive portion and having a longitudinal interior region disposed about at least one optical axis;
   gas mixture means contained within said region comprising predetermined quantities of a buffer gas, xenon, and a fluorine donor gas;
   excitation means for exciting said gas mixture means to produce quantities of xenon fluoride excimer in the excited B and C states;
   optical means disposed along said at least one optical axis and bounding a predetermined portion of said gas mixture means to form an optical cavity having predetermined reflectivity characteristics in the ultraviolet and the visible portion of the spectrum said gas mixture means, said excitation means, and said optical means being interrelated such that said quantities of xenon fluoride excimer form population inversions for both said B→X and C→A transitions and such that said gas mixture means within said optical cavity has sufficient optical gain on both the B→X transition and the C→A transition of xenon fluoride such that the energy conversion efficiencies of said visible and ultraviolet radiation differ by less than a factor of 10, whereby ultraviolet radiation in the B→X band and visible radiation in the C→A band are amplified simultaneously within said optical cavity.

2. A laser according to claim 1, in which said optical means is configured such that said optical axis is the optical axis for both said ultraviolet and visible radiation.

3. A laser according to claim 2, in which said optical means includes reflective means disposed along said optical axia and having predetermined reflectivity in the range of 350 nm and the range of 450-520 nm adapted to produce efficient radiation production in both the visible and the ultraviolet simultaneously.

4. A laser according to claim 1, in which said optical means is configured such that said ultraviolet and visible radiation each have an optical axis passing within said gas mixture means, whereby said optical means forms a first cavity for resonating ultraviolet radiation and a second cavity for resonating visible radiation.

5. A laser according to claim 4, in which said gas mixture means includes krypton at a predetermined pressure such that said optical cavity has optical gain on the 248 nm krypton fluoride transition and also on at least one transition of xenon fluoride.

6. A laser according to claim 5, in which said at least one transition is within the C→A band of xenon fluoride.

* * * * *